April 7, 1964 P. A. BAKER 3,128,343

DATA COMMUNICATION SYSTEM

Filed Aug. 15, 1960 7 Sheets-Sheet 1

INVENTOR
P. A. BAKER
BY J. P. Kearns, Jr.
ATTORNEY

April 7, 1964 P. A. BAKER 3,128,343

DATA COMMUNICATION SYSTEM

Filed Aug. 15, 1960 7 Sheets-Sheet 2

INVENTOR
P. A. BAKER
BY J. P. Kearns, Jr.
ATTORNEY

April 7, 1964 P. A. BAKER 3,128,343

DATA COMMUNICATION SYSTEM

Filed Aug. 15, 1960 7 Sheets-Sheet 3

INVENTOR
P. A. BAKER
BY J. P. Kearns Jr.
ATTORNEY

DATA COMMUNICATION SYSTEM

Filed Aug. 15, 1960 7 Sheets-Sheet 4

INVENTOR
P. A. BAKER
BY J. P. Kearns Jr.
ATTORNEY

INVENTOR
P. A. BAKER
BY J. P. Kearns Jr.
ATTORNEY

INVENTOR
P. A. BAKER
BY
J. P. Kearns, Jr.
ATTORNEY

April 7, 1964 P. A. BAKER 3,128,343

DATA COMMUNICATION SYSTEM

Filed Aug. 15, 1960 7 Sheets-Sheet 7

INVENTOR
P. A. BAKER
BY J. P. Kearns, Jr.
ATTORNEY 3,128,343
Patented Apr. 7, 1964

3,128,343

DATA COMMUNICATION SYSTEM

Paul A. Baker, Summit, N.J., assignor to Bell Telephone Laboratories, Incorporated, New York, N.Y., a corporation of New York Filed Aug. 15, 1960, Ser. No. 49,544
10 Claims. (Cl. 178—67)

This invention relates to communication systems in general and to data communication systems in particular.

It is known to transmit two-condition or binary signals by means of changes in amplitude, frequency or phase. Amplitude-modulation systems are especially susceptible to noise disturbances. Frequency-modulation systems are generally prodigal of bandwidth. Phase-modulation systems, however, are least susceptible to noise of the three systems and are generally conservative of bandwidth. When, furthermore, signals are transmitted as shifts of phase rather than as absolute phases, they may be detected in a stored reference system by comparing the phases of successive signals. By this means bandwidth is conserved because no absolute phase information need be transmitted and synchronism between transmitter and receiver can readily be maintained where a change of phase is produced for every successive signal. The message information transmitted is encoded in the relative phase between successive signals and synchronization information is inherent in the constant phase shift at the transmission rate independently of the message format. To take full advantage of the relative phase shift of the carrier, quadrature modulation is assumed in which a phase shift of some multiple of 45 degrees is provided for each successive signal. Quadrature modulation permits the encoding of successive signals in pairs so that a digital signal can be transmitted at half its generation rate. In the alternative, two channels of information can be transmitted on one carrier wave.

It is the principal object of this invention to establish communication between two geographically separated points for binary digital data without the necessity of transmitting absolute phase information or a pilot wave.

It is a further object of this invention to generate a quadrature phase modulation intelligence signal by digital means in such a manner as to establish a transition between each successive signal even in the case of repeated signal combinations.

It is a still further object of this invention to minimize the distorting effect of transients in the transmitted signal between succeeding output pulses.

In accordance with this invention, these and other objects are accomplished by the employment of ringing circuits tuned to the carrier frequency and causing them to commence oscillation at a particular phase with respect to past oscillations by means of digital logic circuitry. Successive signals are generated by energizing the ringing circuits alternately for successive signals. The phase logic or decisional circuitry constrains each ringing circuit to oscillate in but one of two quadrature phase sets displaced by 45 degrees from each other. As a result, for a completely random signal at least eight separate carrier phases are used. The outputs of the ringing circuits are added to produce a line signal which is constantly advancing in phase at a predetermined transmission rate. As an additional measure, each oscillation is modulated in amplitude by a raised cosine wave at half the transmission rate to allow the quenching at excitation times to occur at minimum amplitude with consequent minimum line transient production.

At the receiver a synchronous detection system is employed. Each received signal phase is delayed by one signal interval and stored until the next signal phase arrives. The successive signals are then modulated together to obtain resultant signals representative of the difference in phase therebetween. This modulation is affected simultaneously on quadrature axes since successive signals have been advanced at the transmitter by a multiple of 45 degrees. Further, in order to establish the correct sampling interval for each signal, a timing signal is recovered from the information signal itself by a novel circuit which forms the subject matter of a copending application of M. A. Logan Serial No. 49,545, filed August 15, 1960, now United States Patent No. 3,020,479, granted February 6, 1962.

A fuller appreciation of the merits of this invention together with a complete description thereof may be obtained from consideration of the remainder of this specification and the drawings in which.

Figure 1:
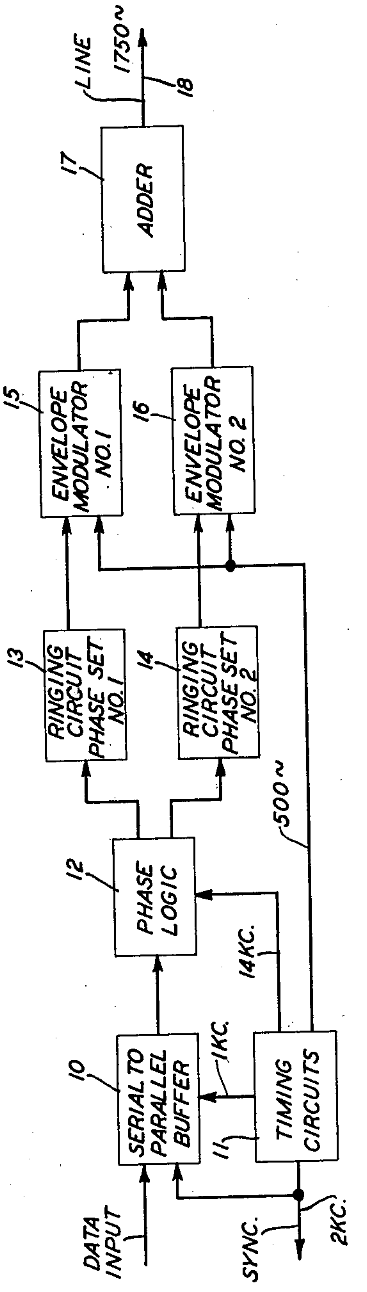
FIG. 1 is a simplified block diagram of a transmitter according to this invention.
Figure 4:
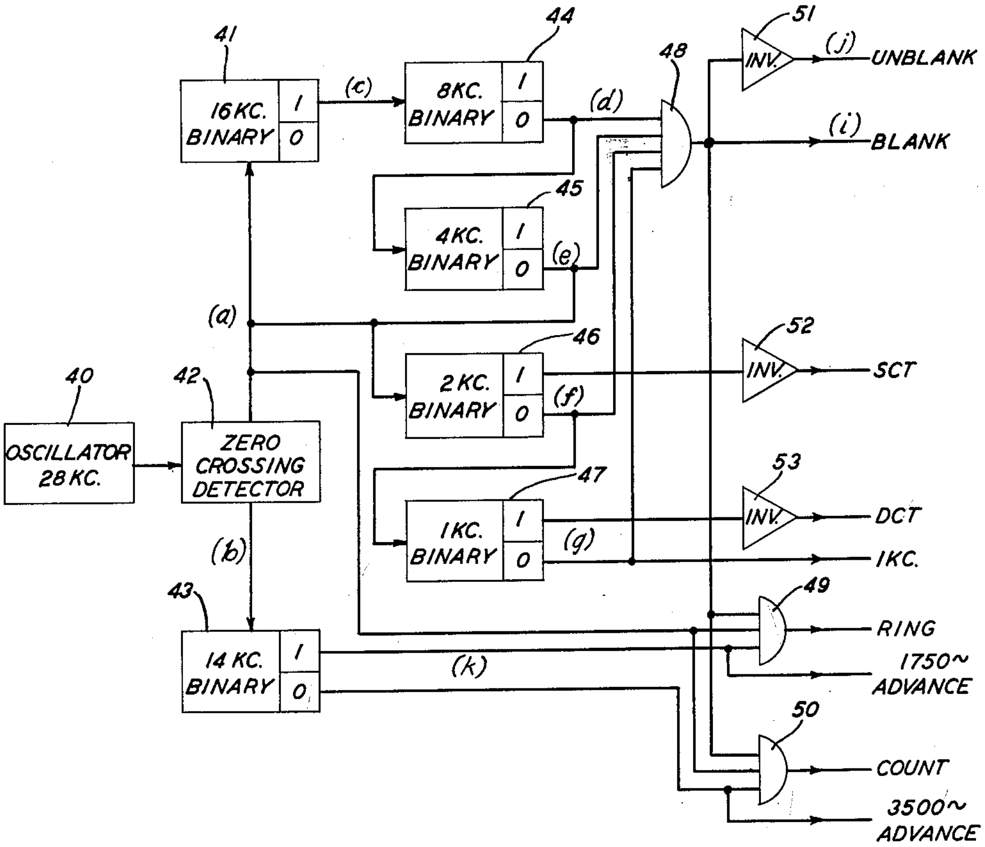
Figure 6:
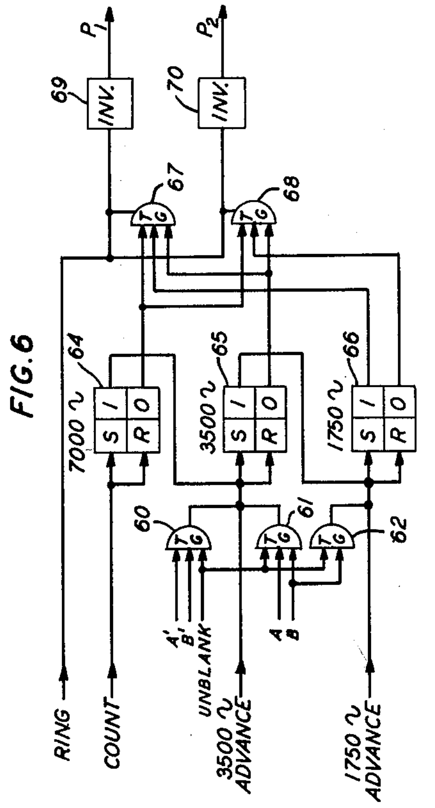
Figure 5:
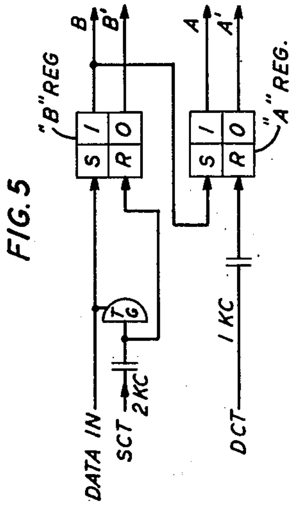
Figure 7:
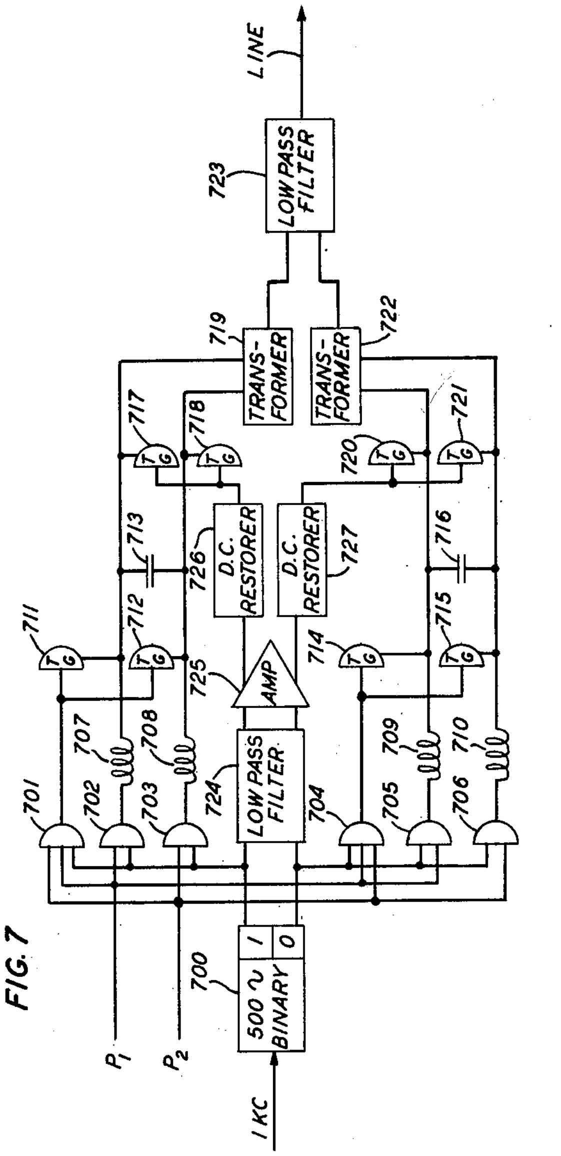
Figure 8:
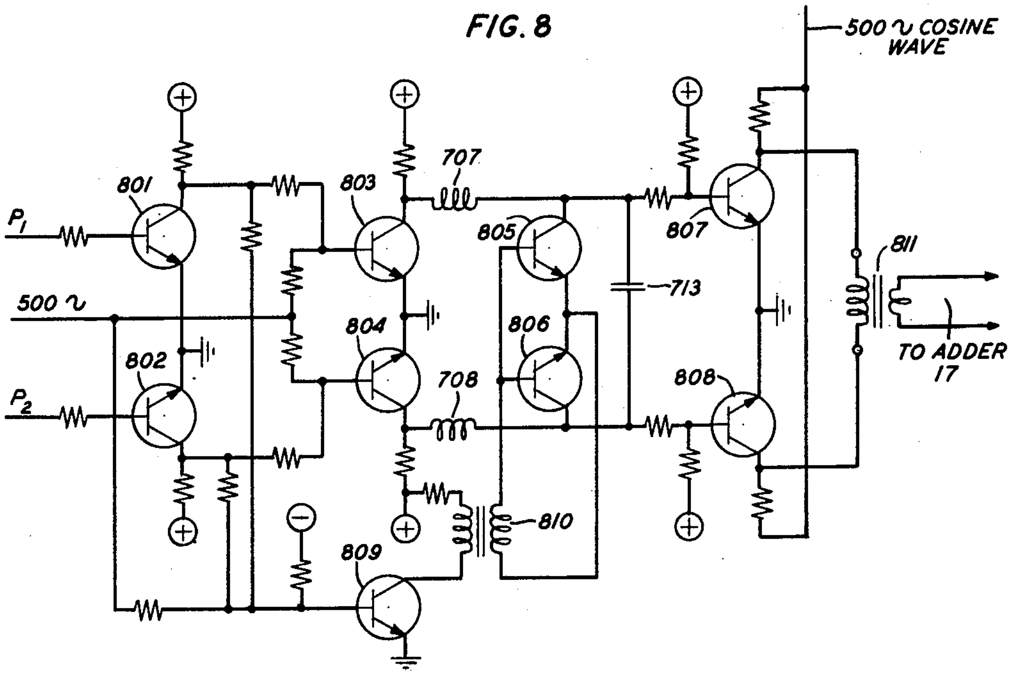
Figure 9:
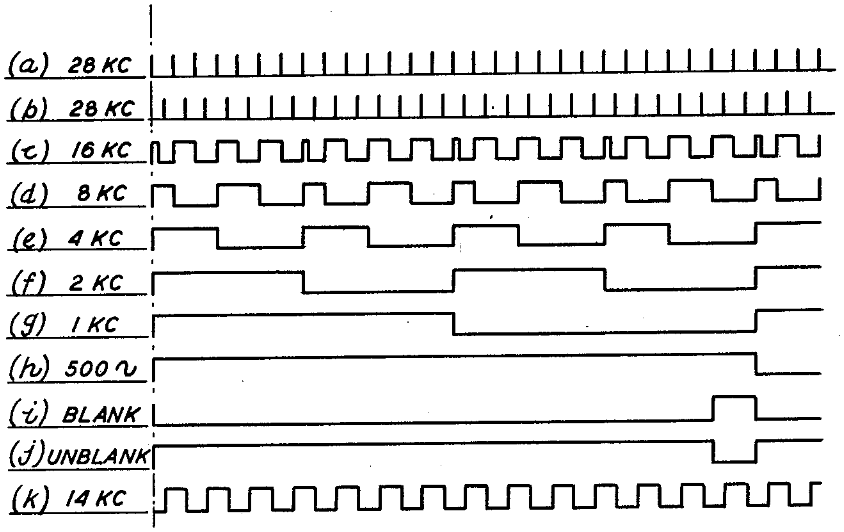
Figure 10:
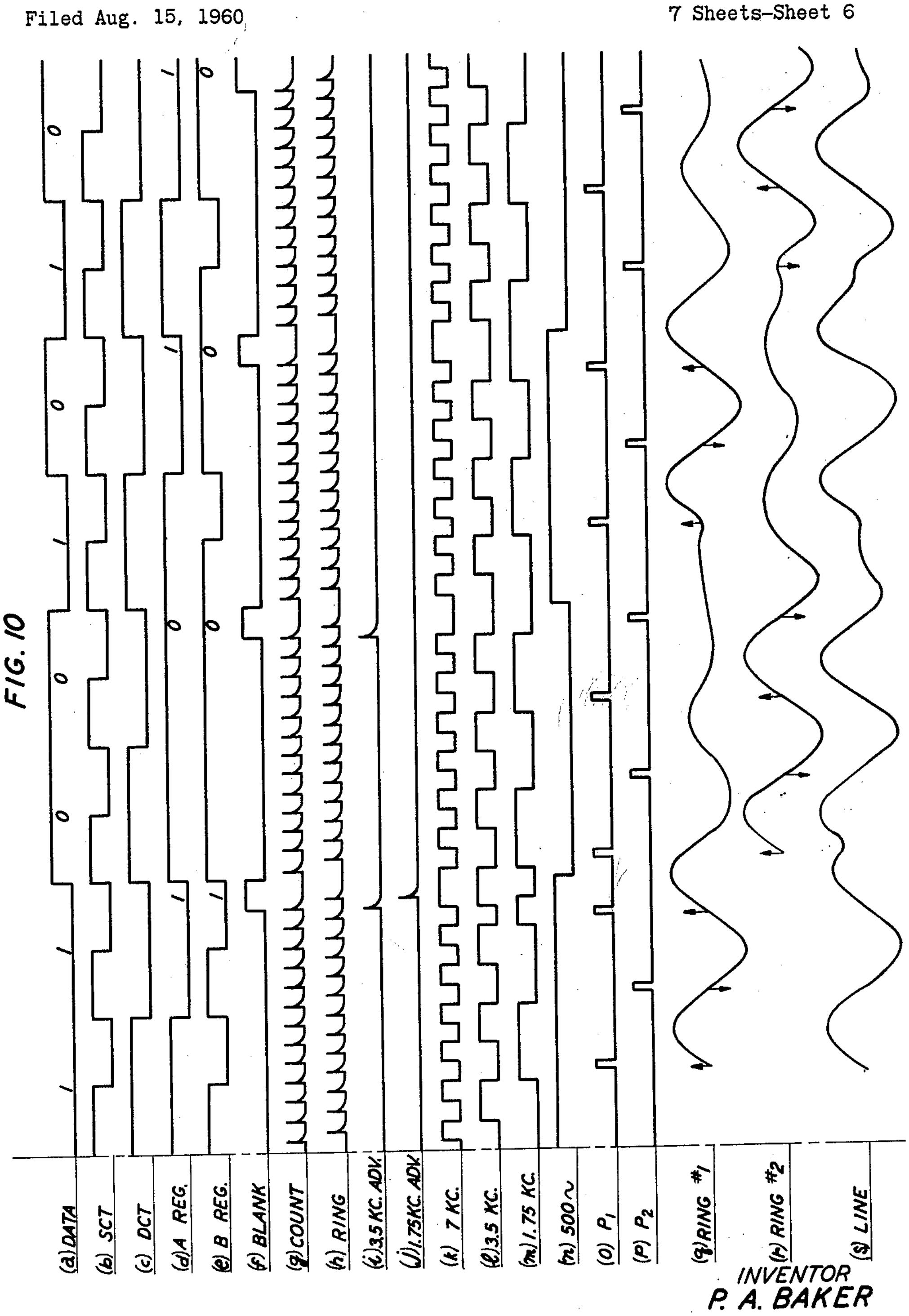
Figure 11:
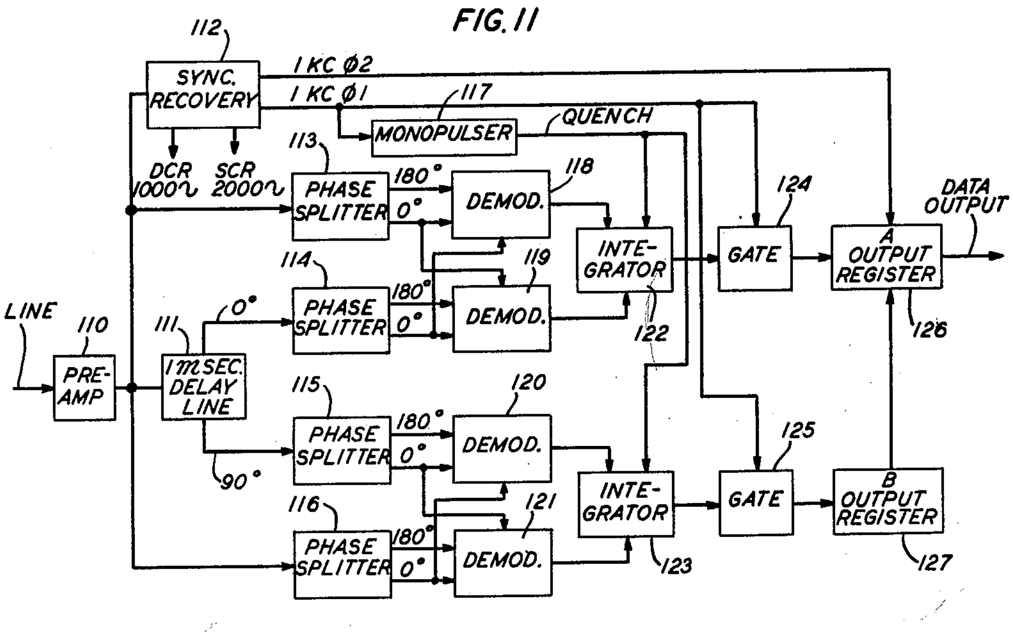
Figure 12:
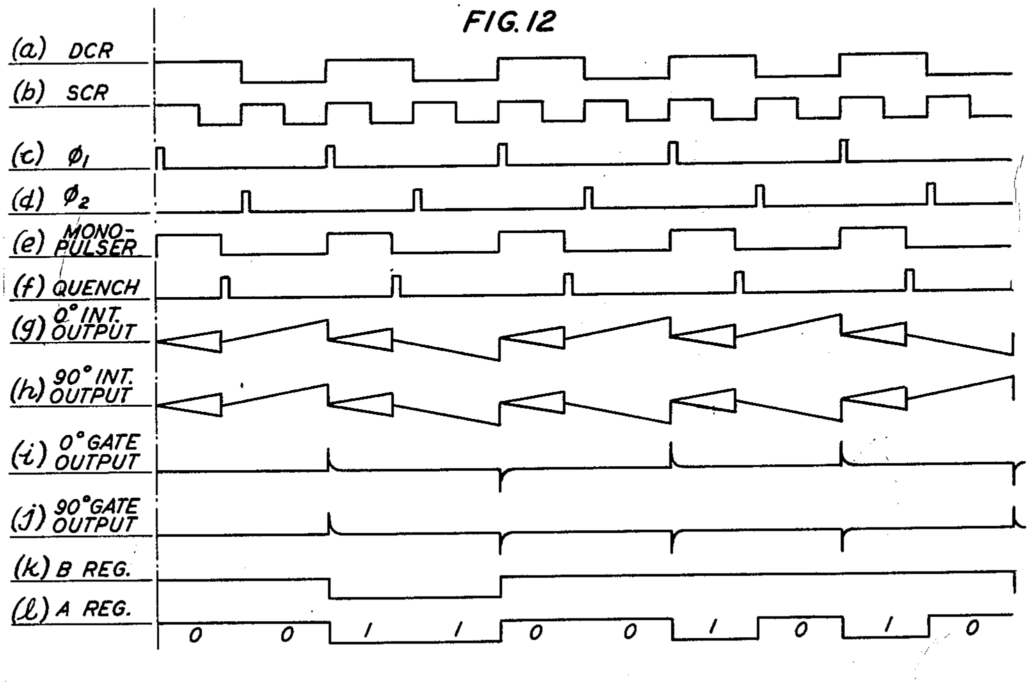

FIGS. 3A through 3F taken together are explanatory of the phase relationships encountered in the transmitter of FIG. 1;

FIG. 4 is a block diagram of a representative timing circuit embodiment useful in the control of the transmitter of FIG. 1;

FIG. 5 is a block diagram of a serial-to-parallel converter for binary data signals used in the transmitter of FIG. 1;

FIG. 6 is a block diagram of a phase logic circuit used in the transmitter of FIG. 1;

FIG. 7 is a block schematic diagram of a ringing circuit and envelope modulator for producing a line signal from the transmitter of FIG. 1;

FIG. 8 is a detailed circuit diagram of the ringing circuit and envelope modulator of FIG. 7;

FIG. 9 constitutes a pulse diagram illustrative of the operation of the timing circuit of FIG. 4;

FIG. 10 constitutes a pulse diagram of the over-all operation of the transmitter of FIG. 1 for a particular data signal input;

FIG. 11 is a detailed block diagram of a receiver in accordance with this invention; and FIG. 12 is a pulse diagram illustrative of the operation of the receiver of FIG. 11.

FIG. 1 is a functional block diagram of a data transmitter embodying features of this invention. Binary digital data, that is, information in the form of a timed train of pulses or no-pulses, are delivered at the left of the figure in raw form at a particular bit rate. The series of input pulses are paired in buffer 10 and applied through logic circuit 12 to one or the other of ringing circuits 13 and 14 alternately. Accordingly, as the pairing of the input pulses results in any of the four possible combinations 00, 10, 01 or 11, the ringing circuits 13 or 14 are excited in an appropriate multiple of 45 degrees relative to the last phase used. The logic is such that ringing circuit 13 can only be excited in one of four phases spaced 90 degrees apart in phase set number 1 and ringing circuit 14 can only be excited in a second phase set designated number 2, the axis of which is 45 degrees from that of phase set number 1. Both ringing circuits are tuned to the desired carrier frequency, which may, for example, lie in the voice frequency range of 300 to 3000 cycles per second. The two separate output waves are further modulated by a raised cosine wave, that is, a cosine wave clamped to the zero axis, in envelope modulators 15 and 16 at half the transmission rate so that the interval during which phase transitions occur is at minimum amplitude. The outputs of both modulators are combined in adder 17 in a straightforward fashion to form a line signal on line 18. Additionally, a block 11, designated timing circuits, provides all clocking facilities for the transmitter including a synchronization signal to the data input system.

Figures 3A, 3B, 3C, 3D, 3E, 3F:
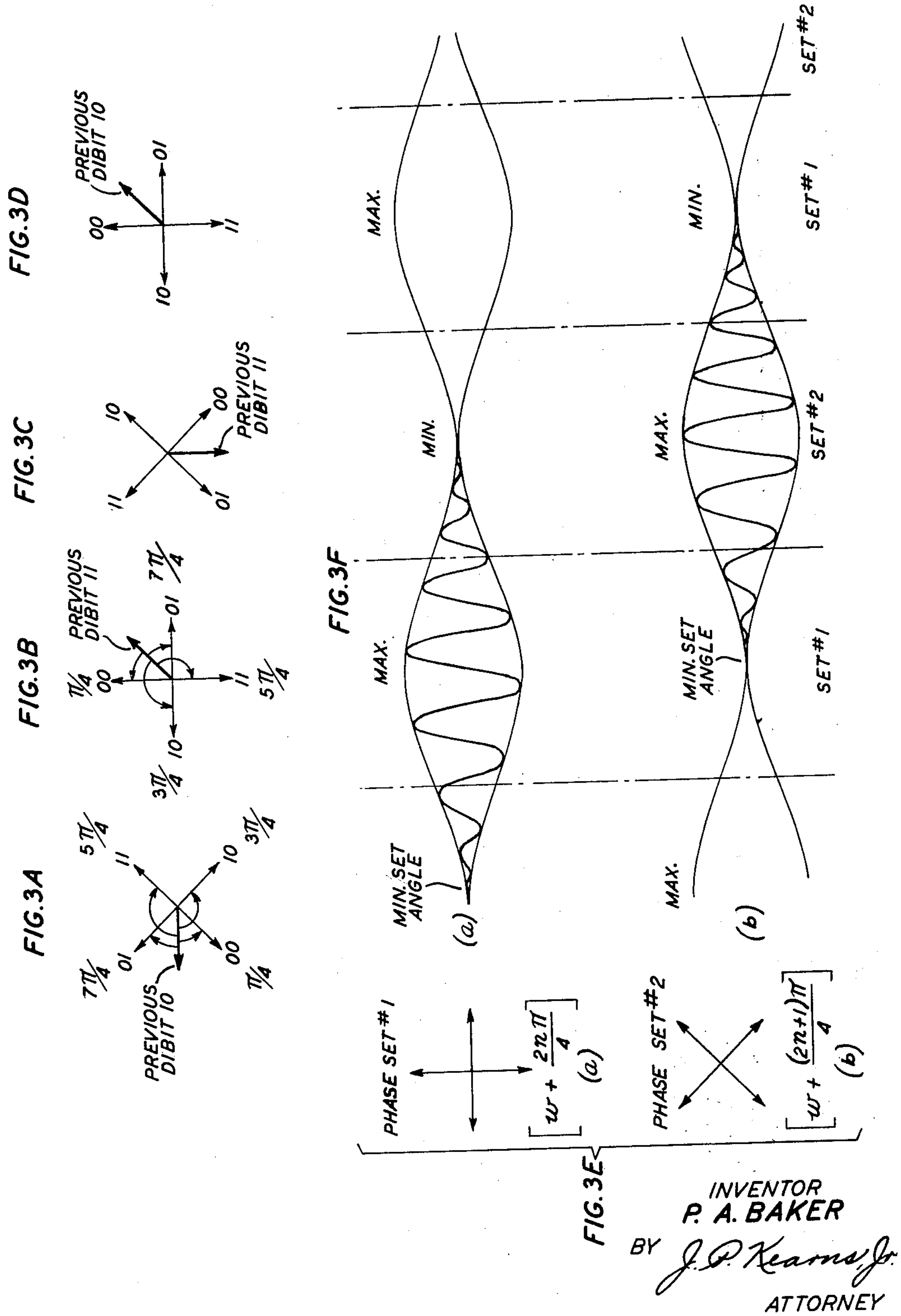

The various subdivisions of FIG. 3 of the drawing illustrate the phase relationships effective in the transmitter of FIG. 1. In this specification I have designated the paired signal combinations "dibits" from the Greek "di" for "double" and "bits" indicating "binary digits." It is apparent that a dibit can also be derived from two independent binary signal channels synchronized from the same clock. FIGS. 3A through 3D show the phase sequence occurring alternately in ringing circuits 13 and 14 for an assumed dibit signal sequence 10, 11, 11, 10. FIG. 3A shows the phase set number 2 of ringing circuit 14 and the position of a previous dibit 10 generated in phase set number 1. Depending on the nature of the next dibit an epoch or initial phase shift angle of an odd multiple of 45 degrees must occur in the other ringing circuit. In this example the next dibit is 11 and therefore a phase shift of 135 degrees (three times 45 degrees) occurs in the clockwise direction. The resultant vector location is shown in FIG. 3B with reference to the axis of phase set number 1. The next dibit is also the combination 11 and another 135 degree phase shift is made to the position shown in FIG. 3C. It is seen that all epoch angle shifts are relative to the position of the last vector and even though dibit combinations are repeated a phase shift is nevertheless made. Thus, a phase transition occurs at the beginning of each dibit period and the task of recovering a synchronizing signal at the receiver is greatly simplified. No separate timing wave need be transmitted, and no reference oscillator is required at the receiver. The last dibit combination assumed here is 10 and is shown in FIG. 3D as a shift of 225 degrees clockwise. It should be pointed out that even a repeated 00 combination calls for a continuous phase shift for each dibit. Other phase pulse systems, as far as is known, based on the use of four-phase vectors only do not provide for phase shifts in the case of repeated combinations.

The remainder of FIG. 3 shows the relationship between the two phase sets effective in each of ringing circuits 13 and 14, respectively, of FIG. 1 and the output waves from the associated envelope modulators 15 and 16. Phase set number 1 effective in ringing circuit 13 is shown in FIG. 3E(*a*). The four vectors are represented by the equation:

$$\theta_1 = \omega + \frac{2n\pi}{4}$$

where $\omega$=the carrier frequency assumed to be 1750 cycles per second in the illustrative embodiment; and $n$=any of the integers 0, 1, 2 or 3.

Similarly, the four vectors in phase set number 2 effective in ringing circuit 14 are shown in FIG. 3E(*b*), and in the accompanying equation:

$$\theta_2 = \omega + \frac{(2n+1)\pi}{4}$$

where $\omega$=the carrier frequency; and $n$=any of the integers 0, 1, 2 or 3.

Subtraction of $\theta_2$ from $\theta_1$ shows that the two sets differ by $\pi/4$ radians or 45 degrees.

FIG. 3F shows the waveforms resulting from the ringing circuits as modulated by the raised cosine envelopes at half the dibit rate. FIG. 3F(*a*) represents the output due to phase set number 1, and FIG. 3F(*b*) represents the output due to phase set number 2. When phase set number 1 has its maximum amplitude, phase set number 2 has its minimum amplitude. The ringing circuits are activated during the minimum amplitude instants to reduce the transient on the line as much as possible. Both outputs are combined in the adder 17 to produce a continuous line signal as will be more fully described hereinafter.

Figure 2:
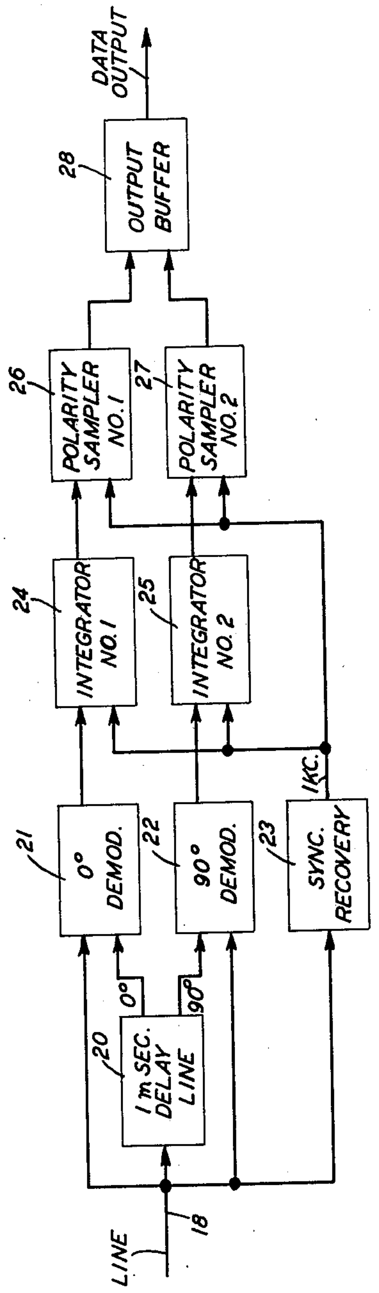
FIG. 2 is a simplified block diagram of a receiver according to this invention.

FIG. 2 is diagrammatic of the operation of a receiver according to this invention. In the practice of this invention it is expected that a carrier frequency, such as 1750 cycles per second shown in the illustrative embodiment about midway in the voice frequency band, will be chosen so as to make it possible to employ this data communication system in the public switched telephone network. By choice of such a frequency all the necessary sideband information is includible within the pass-band of existing voice transmission systems. The line signal on conductor 18 is applied in parallel directly to a pair of demodulators 21 and 22, also designated 0 degree and 90 degree modulators, and to a one-millisecond delay line 20. The delay line includes two output points displaced 90 degrees from each other with respect to the carrier frequency. The respective delay line outputs are applied to the demodulators 21 and 22 in order to intermodulate the 0 degree and 90 degree components of successive dibits and hence determine the phase differences between successive dibits which are necesarily separated by some multiple of 45 degrees. The simultaneous outputs of the demodulators 21 and 22 will always differ in phase by 90 degrees and therefore lie in adjacent quadrants. In order to obtain an output signal of sufficient amplitude to sample, integrators 24 and 25 follow the respective demodulators 21 and 22. Because of the ratio between the chosen carrier frequency of 1750 cycles per second and the dibit rate of 1000 cycles per second, one and three-quarters cycles of carrier wave at each particular phase occur in each dibit interval. Therefore, the output of the integrators is either positive or negative at the end of each dibit interval. It remains only to determine the polarity of these outputs to recover the individual signal bits. This function is accomplished in polarity samplers 26 and 27 which produce 1 or 0 outputs accordingly. The output buffer 28 is a parallel-to-serial converter and feeds the recovered data to the output terminal at a 2000 bit per second rate. Block 23 represents a unique synchronization recovery system described in a separate application as mentioned hereinbefore. Its output is a 1000-cycle per second timing wave which governs the sampling of the output of the polarity samplers 26 and 27 and provides quenching for the integrators between dibit intervals.

In connection with the relationship between the dibit rate and the carrier frequency, it should be noted that it is necessary to choose a ratio between carrier and dibit rates such that an integral number of quarter cycles of the carrier wave is generated during each dibit interval. If such a ratio is not chosen, certain successive signal combinations may not result in a transition phase shift of the carrier wave between the end of one dibit interval and the beginning of the next, even though the epoch angles have been shifted with respect to each other. Thus, for a dibit rate of 1000 cycles per second as used here the carrier frequency must be one of 1500, 1750, 2000 cycles per second and so forth. These are in the ratios of 6/4, 7/4 and 8/4 with the dibit rate and produce respectively one and one-half, one and three-quarters and two cycles of carrier wave per dibit interval. An integral number of one-eighth cycles of carrier per dibit interval, for example, would produce a smooth transition at the end of a dibit for a 45 degree phase shift between starts of the dibit interval.

The remaining figures of the drawing show in more detail an operative illustrative embodiment of a data transmission system according to this invention, together with pulse diagrams which explain the operation of the system.

FIG. 4 is a block diagram of a representative timing source used in coordinating the functions of the data communications system of the invention and corresponds to block 11 in FIG. 1. Conventional circuit elements are used throughout and therefore this figure of the drawing portrays only one of several possible alternative solutions to the timing problem. A master oscillator 40, which may be crystal controlled, serves as the principal timing source and a frequency of 28,000 cycles per second is chosen as the least common multiple of the several frequencies used in the system. These frequencies include a 1750-cycle carrier, a 1000-cycle transmission rate, a 2000-cycle serial bit rate, and a 500-cycle amplitude modulation rate. Oscillator 40 is a sinusoidal oscillator of any stable design. The output is fed to a zero crossing detector 42 which may be constituted of a push-pull circuit having separate outputs. One output is derived from the positive-going zero crossings and the other output is similarly derived from the negative-going zero crossings. The resultant outputs are shown in FIG. 9 at lines (*a*) and (*b*). Two 28-kilocycle pulse trains 180 degrees out of phase are formed as shown. The small letters in parentheses on FIG. 4 indicate the locations of the correspondingly letter waveforms on FIG. 9.

In order to obtain the derivative pulse trains from oscillator 40, bistable multivibrators, commonly referred to as binaries as defined in Chapter 5 of Millman and Taub's "Pulse and Digital Circuits" (McGraw-Hill Book Company, Inc., 1956), are used as count-downs from 28 kilocycles to 500 cycles per second. Although the binaries described by Millman and Taub employ electron tubes, it has been found that good operation with good circuit economy is possible with equivalent direct-coupled transistor circuits and the latter were in fact used in the practice of the invention.

The binaries in FIG. 4 are shown as having a "1" (marking) output and a "0" (spacing) output. The outputs are always opposite in sense. Whenever the "1" output is grounded, the "0" output is positive. Ground is arbitrarily used as indicating a "1" output throughout the system.

Waveform (*a*) from detector 42 is applied to 16-kilocycle binary 41 which changes its output state for each input pulse. Only the "1" output of binary 41 is used and this drives an eight-kilocycle binary 44. Binary 44 in turn drives four-kilocycle binary 45. The four-kilocycle output is further divided by two-kilocycle binary 46 and one-kilocycle binary 47. Ordinarily the output of binary 41 would be at 14 kilocycles, but because of the feedback from the "0" output of binary 45 to the input of binary 41, an additional change of state is induced in binary 41 before every seventh pulse from zero crossing detector 42. Effectively binary 41 changes state sixteen times for every fourteen impulses from detector 42. Thus, it is seen in FIG. 9 that waveform (*c*) is not a symmetrical square wave throughout. Neither are the output waveforms (*d*) and (*e*) from binaries 44 and 45 symmetrical square waves. However, the output waveforms (*f*) and (*g*) from binaries 46 and 47 are seen to be symmetrical. The operation of binary chains with feedback is described in the aforesaid Millman and Taub work on pages 329 and 330.

The output waveform (*b*) from detector 42, which is 180 degrees out of phase with respect to waveform (*a*) is applied to a further 14-kilocycle binary 43 to produce output waveform (*k*) from which the carrier frequency phases are later derived.

Also shown in FIG. 4 are logical AND gates represented by semicircles such as 48, 49 and 50. An output occurs only when all inputs are simultaneously grounded. Inputs are indicated on the straight side of the symbol and the single output is shown leaving the curved side. Any well-known diode, direct-coupled transistor or other such circuit may be so represented. Transistors were used in the practice of this invention, although the other circuits could be used as well. The triangles, such as 51, 52 and 53, represent inverters, that is, devices in which a positive input produces a grounded output and vice versa.

The "0" outputs of binaries 44, 45, 46 and 47 are applied to the input of AND gate 48 to produce the blank output (*i*) once every millisecond for a purpose to be described later. The corresponding unblank output (*j*) is formed at the same time from the output of inverter 51. Similarly, a ring and a count output are derived through AND gates 49 and 50 from outputs of binary 43, detector 42 and AND gate 48. These outputs are a series of 14-kilocycle pulses whose functions are explained hereinafter. The remaining outputs of the timing circuit of FIG. 4, namely: serial clock timing (SCT), data clock timing (DCT), 1750-cycle advance, and 3500-cycle advance are obtained in an obvious manner.

FIG. 5 is an illustrative embodiment of a practical serial-to-parallel buffer as shown in FIG. 1 as block 10. The buffer comprises two binaries labeled "A" register and "B" register and a transmission gate TG. The latter is any device which is normally grounded but which may be transformed into an open circuit upon application of an appropriate input pulse. In this circuit the transmission gate controls the input of data pulses to the "B" register. Here the transmission gate is controlled by the 2000-cycle SCT square wave from the timing circuit of FIG. 4. The DCT and SCT waves are differentiated, as indicated by the capacitors in series with their sources, to provide input pulses at their positive-going transitions.

The function of the circuit of FIG. 5 is to transform the serial input data into two-bit parallel form. The data is here assumed to occur in non-return-to-zero serial form. An arbitrary data sequence is shown in line (*a*) of FIG. 10 as the sequence 11001010 for purposes of this description. The data registers are shown as having two inputs designated set (S) and reset (R) and two outputs designated "1" and "0." They are identical to the binaries in the timing circuit except that the latter had the two inputs connected in parallel and consequently were not shown separately. The "B" register receives a data input bit whenever the SCT wave is at ground potential. At the same time the SCT wave resets the "B" register on its positive-going transitions. The "1" output of the "B" register is then fed to the "S" input of the "A" register, and the latter is reset at a 1000-cycle rate by the DCT wave. The four outputs of the two registers designated A, A′, B and B′ are later used in combination to determine the appropriate phase shift to be imparted to the carrier wave. The primed outputs are the inverse of the unprimed outputs.

The operation of the buffer of FIG. 5 becomes apparent from a consideration of the first five lines of the FIG. 10 pulse diagram. In the data of line (*a*) "1" is arbitrarily represented as ground potential. Similarly, in lines (*d*) and (*e*) ground potential represents the set condition of the registers indicating a grounded output on the "1" output and a positive output on the "0" output. Assume that both registers are in the reset condition initially. A "1" data bit is present. As the SCT wave goes negative, the data "1" is passed to the "S" input of the "B" register and a "1" appears at its "B" output. (B′ is thus made positive.) The next positive transition of the SCT wave resets the "B" register. The following negative transition of the SCT wave opens the transmission gate and, since the data bit is still a "1", the "B" register is set again. The process continues in the same fashion throughout the data message. Where the data is a "0", the "B" register remains reset as shown for the third data bit.

Since the "1" output of the "B" register connects to the "S" input of the "A" register and the latter register is under the reset control of the DCT wave, a similar analysis explains the operation of the "A" register. Whenever the DCT wave makes a positive transition, the "A" register is reset. The "A" register can be set by a "1" output standing in the "B" register as the "B" register is reset on the positive transition of the SCT wave. Thus is the wave form of line (*d*) of FIG. 10 derived.

The diagram of FIG. 6 shows the phase logic circuitry for determining the phase to be imparted to the carrier and to remember what phase was previously employed. The circuit comprises the three binaries 64, 65 and 66 and associated input and output transmission gates 60, 61, 62, 67 and 68. Binary 64, called 7000-cycle, is driven by the count output of the timing circuit of FIG. 4. The count output is a 15-kilocycle wave as shown on line (g) of FIG. 10 and is derived from the 14-kilocycle binary 43 in FIG. 4. It recurs regularly except during the presence of the blanking pulse. Binary 64 with a count-down of two produces therefrom a 7000-cycle square wave, which reverses phase after the occurrence of the blanking pulse. The "1" output of binary 64 drives 3500-cycle binary 65, which in its turn drives 1750-cycle binary 66. Binaries 65 and 66 have additional inputs from the timing circuit controlled by transmission gates 60, 61 and 62 so that the phase can be adjusted in accordance with the input information signal. The inputs from the timing circuit labeled 1750-cycle and 3500-cycle advance are 14-kilocycle square waves 180 degrees out of phase. Wave form (k) of FIG. 9 and its inverse show these waves. Because of the transmission gates these wave trains can only affect binaries 65 and 66 during the presence of the unblanking pulse, at which time the condition of the "A" and "B" registers of FIG. 5 is examined. From the numerical relation between the designations of binaries 64, 65 and 66 it can be seen that a reversal of the phase of the 7000-cycle binary is equivalent to a 45 degree phase shift of the output of the 1750-cycle binary. Similarly a reversal of phase of the 3500-cycle binary 65 is equivalent to a 90 degree phase shift in the output of the 1750-cycle binary. Finally a reversal of phase in binary 66 reverses the phase of the carrier wave. Because the count wave has a missing pulse every blanking interval, the 7000-cycle binary is reversed in phase every dibit interval regardless of the nature of the intelligence signal. Thus, a minimum of 45 degrees of phase shift occurs in the carrier signal between each dibit to insure the transmission of synchronizing information at all times. The fact that the 7000-cycle binary is under the control of the count input, independent of the message signal, makes that binary a memory cell for the phase last transmitted.

The input logic is determined by the three transmission gates 60, 61 and 62 in such a way that for the four possible dibit combinations the following phase shifts are effected. For the combination 00 transmission gate 60 permits an extra impulse to be applied to binary 65, thus causing a 135 degree phase shift of the carrier wave (45 degrees from the invariant shift of binary 64 and 90 degrees from the shift of binary 65). The combination 01 opens transmission gate 62 only and permits a 180 degree phase shift of binary 66 to be superimposed on the regular shift of binary 64 for a total shift of 225 degrees. The combination 11 opens gates 61 and 62 simultaneously to shift binaries 65 and 66. The total phase shift is then 315 degrees. Finally the combination 10 does not affect any of the transmission gates and only the 45 degree phase of binary 64 occurs.

It is to be pointed out that the phase shift angles mentioned above are not absolute but relative to the prior phase generated, because the invariant 45 degree shift of the 7000-cycle binary in effect remembers the last phase shift. The other two binaries are driven by the 7000-cycle binary. It is therefore apparent that there are a total of eight phase positions that can be assumed by the carrier frequency. It should be noted that for a different carrier frequency the coding would have to be changed to avoid the possibility of smooth transitions caused by certain code combinations.

The keying or control outputs $P_1$ and $P_2$ are derived from the phase logic circuit of FIG. 6 through transmission gates 67 and 68. The ring input from the timing circuit occurs at 14 kilocycles per second and thus is eight times the assumed carrier frequency of 1750 cycles per second. Therefore, each ring pulse interval is equivalent to a 45 degree phase interval of the carrier frequency. By means of the gates 67 and 68 several of these 14-kilocycle pulses in each dibit interval are transmitted to the ringing circuits to generate the carrier wave in accordance with the settings of the phase logic binaries. Transmission gate 67 opens once every "1" cycle of the 1750-cycle binary and when the 7000-cycle and 3500-cycle binaries 64 and 65 are coincidentally in their "0" states to produce a $P_1$ output. Similarly transmission gate 68 opens 180 degrees later with respect to the carrier frequency once each time the "0" cycles of all three binaries occur simultaneously to produce a $P_2$ output. Thus, the $P_1$ and $P_2$ outputs occur 180 degrees apart with respect to the carrier frequency and furnish suitable excitation pulses to the ringing circuits. The inverters 69 and 70 transform the output pulses into the proper polarity for use in the ringing circuits.

FIG. 10 shows the wave forms developed in the logic circuit of FIG. 6 for the representative data input previously assumed, namely, 11001010. Line (k), for example, shows that the 7000-cycle output of binary 64 reverses its relative phase every blanking interval (line (f)). Line (i) shows that a 3500-cycle advance pulse is produced during the blanking interval when the dibit combination is either 11 or 00. Line (j) shows that the 1750-cycle advance pulse occurs when the dibit combination during the blanking interval is 11. As explained above, the 1750-cycle advance pulse also occurs when the dibit combination is 01. Lines (1) and (m) show the resultant outputs of binaries 65 and 66 under the combined control of the output of binary 64 and the advance pulses. Lines (o) and (p) show the $P_1$ and $P_2$ pulses formed as a consequence of the data message assumed.

The $P_1$ and $P_2$ keying pulses from the logic circuit of FIG. 6 are applied to the ringing circuits of FIG. 7, which perform the functions shown in blocks 13 through 17 of FIG. 1. The ringing circuit of FIG. 7 comprises two separate ringing circuits, a pair of modulators, input and output logic and a 500-cycle binary. One ringing circuit comprising coils 707 and 708 and capacitor 713 produces a carrier output signal in phase set number 1. The other ringing circuit comprising coils 709 and 710 and capacitor 716 produces a carrier output signal in phase set number 2. Both sets are identical in operation and function alternately as the inputs $P_1$ and $P_2$ are directed to one or the other set by the output of 500-cycle binary 700. The input to the first ringing circuit includes AND gates 701, 702 and 703. These gates are enabled when binary 700, controlled by the 1000-cycle square wave from the timing circuit of FIG. 4, has a "1" output. Gates 702 and 703 have, in addition to the 500-cycle input, a $P_1$ or a $P_2$ input; while gate 701 has both $P_1$ and $P_2$ as inputs. The outputs of gates 702 and 703 are applied to the coils 707 and 708, respectively. These coils are effectively in series with capacitor 713. For a $P_1$ input current flows into coil 707, and for a $P_2$ input current flows into coil 708.

The output of gate 701 also controls two transmission gates 711 and 712. In the absence of a $P_1$ or $P_2$ pulse the gates 711 and 712 are open, but when either $P_1$ or $P_2$ occurs the gates close and the capacitor is shorted or quenched. Therefore, on the occurrence of one of the keying pulses the coil receives a charging current and at the end of the pulse the charging current flows into the capacitor to begin an oscillation. The next keying pulses occur at the proper times to insure a regulated 1750-cycle output wave under the control of the master timing circuit of FIG. 4.

The other ringing circuit comprising AND gates 704, 705 and 706; coils 709 and 710; capacitor 716; and transmission gates 714 and 715 function in an exactly similar manner on the other half-cycle of the 500-cycle wave.

Lines (q) and (r) of FIG. 10 show clearly the production of the carrier waves by the circuit of FIG. 7. The small arrows indicate the impulses corresponding to the $P_1$ and $P_2$ pulses incident on the respective ringing circuits. The upwardly directed arrows correspond to the $P_1$ pulses and the downwardly directed arrows correspond to $P_2$ pulses. Clearly the frequency of the carrier wave is closely controlled by the interval between the logic pulses. After the third (sometimes four pulses occur) pulse the ringing circuit is free running but is damped out within a few more cycles.

The output of the 500-cycle binary 700 serves another function also. The 500-cycle square wave is passed through low-pass filter 724 to smooth it into a sinusoidal wave. This wave is then amplified by a differential amplifier 725 to two phases of smoothed 500-cycle wave. Each phase is then applied to a direct-current restoration network 726 or 727 to produce raised cosine wave forms. These voltage wave forms are positive with respect to ground at all times. The raised cosine waves are applied to transmission gates 717, 718, 720 and 721. These latter gates are connected in parallel with the terminals of capacitors 713 and 716 as shown in FIG. 7 to amplitude modulate the wave forms developed across the capacitor. The unmodulated capacitor wave forms are those on lines (*q*) and (*r*) of FIG. 10. After combining with the 500-cycle wave and with each other in transformers 719 and 722 and in low-pass filter 723 a transmission line wave represented by line (*s*) of FIG. 10 results. It can be seen that about one and three-quarters distinct cycles of each particular carrier phase are developed. The 500-cycle superimposed wave attenuates effectively the transitions between phases as previously discussed and as shown more graphically in FIG. 3F.

FIG. 8 is a detailed circuit diagram of a practical embodiment of one of the ringing circuits of FIG. 7. Switching type junction transistors are used in this particular embodiment for illustrative purposes only. Nine transistors are used. Input transistors 801 and 802 invert the $P_1$ and $P_2$ keying pulse, respectively. In the absence of input pulses these transistors are normally unsaturated so that the collector terminals are substantially at collector supply potential. With the occurrence of a pulse the collector potential falls rapidly toward ground as the transistor becomes saturated. Transistors 803 and 804 act as gates for the ringing circuit. Their bases are connected through isolating resistors to the collectors of the input transistors as well as to the 500-cycle input, and are in saturation when the 500-cycle signal is positive. Thus, when a keying pulse and the 500-cycle positive input occur together, the gating transistors are unaffected. When the 500-cycle input is at ground the keying pulses control the gating transistors. These latter transistors operate as AND gates. To their collectors are connected the ringing inductances 707 and 708 and to the other terminals of the inductances is connected the ringing capacitor 713.

In addition, there is provided a quenching circuit comprising gating transistor 809 and quenching transistors 805 and 806. Gating transistor 809 is normally held in saturation. The base electrode is connected to the 500-cycle source and to the collectors of transistors 801 and 802. Thus, when the 500-cycle signal is at ground potential, transistor 809 is switched into cut-off when either an input $P_1$ or $P_2$ pulse occurs to ground one of the collectors of transistor 801 or 802. Transistor 809 is effectively an OR gate because of the negative bias on its base electrode. The transistor may thus be cut off even though one of its three inputs is still positive.

In the collector circuit of gating transistor 809 is connected the primary of a pulse transformer 810. The secondary winding of transformer 810 is connected between the emitter and the base electrodes of quenching transistors 805 and 806. The collectors of transistors 805 and 806 are bridged across the terminals of ringing capacitor 713. Inasmuch as the emitters and bases of these transistors are connected together through the secondary winding of transformer 810, the saturation state occurring in both simultaneously shorts the capacitor terminals and quenches any voltage appearing across it.

The output transistors 807 and 808 are coupled at their bases to the ringing capacitor and at their collectors to the smoothed 500-cycle cosine wave. The collectors are also connected to transformer 811 which combines the push-pull output of transistors 807 and 808. The bases of the latter transistors are biased slightly positive as shown for linear operation. The output of transformer 811 extends to the adder circuit 17 of FIG. 1.

The operation of the circuit of FIG. 8 is such that the coincidence of the ground half of the 500-cycle square wave and a $P_1$ or $P_2$ keying pulse allows one or the other of transistors 803 or 804 to be cut off. The collector voltage of the affected gating transistor rises rapidly toward the supply voltage and a charging current flows through the associated inductances 707 and 708 in one direction. At the same time the occurrence of a $P_1$ or $P_2$ pulse allows transistor 809 to be cut off and the current in the primary winding of pulse transformer 810 collapses. This action induces a current in the secondary of the pulse transformer which is poled in such a direction as to saturate transistors 805 and 806. The capacitor voltage is quenched and the inductive current through coils 707 and 708 flows in series to ground through the unaffected one of the two transistors 803 or 804, which has remained in saturation. On the cessation of the $P_1$ or $P_2$ pulse, the capacitors begin charging from the inductances in one direction. The next keying pulse cuts off the other of transistors 803 or 804 and the inductances are charged in the opposite direction. The capacitor is quenched as before. On the other half-cycle of the 500-cycle square wave the $P_1$ and $P_2$ pulses can have no effect on the ringing circuit. The output transistors, having their collector voltage supplied from a 500-cycle cosine wave, modulate the oscillatory wave from capacitor 713 in amplitude to quench the entire output during transition periods.

On the other half of the 500-cycle square wave a duplicate ringing circuit identical to that of FIG. 8 is enabled. The outputs of the two ringing circuits are combined in additive fashion to produce a line signal such as is shown in line (*s*) of FIG. 10.

FIG. 11 is a more detailed block diagram of a receiver useful in the practice of this invention than that shown in FIG. 2. The line signal is received in attenuated form and amplified to a usable level in preamplifier 110. The output of the preamplifier is applied in parallel to a synchronization recovery circuit 112, phase splitters 113 and 116, and a one-millisecond delay line 111. The one-millisecond delay time corresponds to one dibit interval. The synchronization circuit operates on the 1000-cycle transitions in the line signal to generate a 1000-cycle and a 2000-cycle square wave. Also by conventional means the 1000-cycle square wave is transformed into two 1000-cycle pulse trains 180 degrees apart from the positive and negative transitions of the 1000-cycle square wave as shown in lines (*c*) and (*d*) of FIG. 12. Lines (*a*) and (*b*) of FIG. 12 show the recovered data clock receiver (DCR) and serial clock receiver (SCR) square waves corresponding to the DCT and SCT waves of FIG. 10. One of the 1000-cycle output pulse trains drives a monopulser or monostable multivibrator to produce in a well-known manner an irregular rectangular wave as shown in line (*e*) of FIG. 10. Included in the output of the monopulser is a differentiator to produce a quenching pulse train, as shown in line (*f*) of FIG. 10, for suppressing any spurious signals generated on the line during interdibit intervals.

The preamplifier output applied to the delay line 111 is delayed by one dibit period or, in this particular example, one millisecond. The delay line may be of any well-known multisection inductor-capacitor circuit construction or even of an acoustic type. Two outputs are provided, one of which is shifted 90 electrical degrees from the other at the 1750-cycle carrier frequency. The inputs to phase splitters 113 through 116 either directly from the output of the preliminary amplifier 110 or indirectly from the outputs of the delay line 111 are split according to their positive and negative half-cycle into 0 degree and 180 degree outputs. The phase splitters may be composed of diode or triode rectifiers. Transistors were used in a successful working embodiment with equal resistors in emitter and collector circuits. In demodulators 118 through 121 the phase split 0 degree and 180 degree halves of the present and previous (delayed) waves are intermodulated by using the opposing 0 degree waves as switching voltages. Thus, there are formed sums of the 180 degree present and previous waves and of the 0 degree present and previous waves. The difference between the respective sums results in unsymmetrical waves predominantly of one or the other polarity. The demodulating transistors are arranged in push-pull fashion with base drives supplied by the outputs of the phase splitters of either the present or previous signals and collector power furnished from the 0 degree phase of the opposite phase splitter.

The unsymmetrical waves resulting from the demodulation process are applied to the integrators 122 and 123, which are comprised of capacitors in a well-known manner. The integrators are supplied with a quenching signal from monopulser 117 in the manner described in connection with FIG. 8. The output of the integrators is in the form of substantially saw-tooth waves as shown in lines (*g*) and (*h*) of FIG. 12. The second quenching shown in FIG. 12 is accomplished in the following gate circuits by the phase number 1 pulses of line (*c*). The integrator outputs are applied to gate circuits 124 and 125 to which are also applied the phase number 1 pulses from the synchronization recovery circuit. The outputs of the gate circuits are accordingly positive or negative pulses, as shown in lines (*i*) and (*j*) of FIG. 12, corresponding to the condition of the integrating circuits at sampling time.

The output of gate 124 drives the "A" output register or binary and the output of gate 125 drives the "B" output register or binary. The output of the "B" binary also drives the "A" binary and the final serial output is taken from the "A" binary. The "A" binary also obtains a reset impulse from the phase number 2 output of the synchronization recovery circuit 112. The "B" binary is controlled by the output of gate circuit 125 as shown in line (*j*) of FIG. 12. Each positive impulse from the gate circuit sets the "B" binary as shown on line (*k*) of FIG. 12 and each negative impulse resets it. The "A" register is set by positive output pulses from gate 124 and is reset by the phase 2 synchronizing pulses of recovery circuit 112 or by negative pulses from gate 124 providing the "B" binary is not in the set condition at that time. The resulting output of the "A" binary is shown on line (*l*) of FIG. 12. If a properly phased 2000-cycle sampling gate (not shown) is connected to the output of the "A" binary, the intelligence signal can be recovered in serial form matching that of the original signal applied to the transmitter. A comparison of line (*l*) of FIG. 12 with line (*a*) of FIG. 10 shows clearly the correspondence between the transmitted and received signals. The first two "0" signals of line (*l*) of FIG. 12 are to be ignored because of the delays inherent in the receiver.

While the system of this invention has been described in terms of a specific illustrative embodiment, it will become apparent to one skilled in the art that various other possible ways of instrumenting it are available. The system of the invention may be applied to a dual channel data system by the simple omission of the input and output buffers. In this case the data rate and transmission rates would be identical. It is also possible to apply several of these systems to multiplex transmission by generating different carrier frequencies. Furthermore, since the output of the ringing circuits are clipped by the cosine amplitude modulation, it would be possible to replace the sinusoidal ringing circuits by square wave generating circuits.

What is claimed is:

1. In a phase-modulated carrier transmission system in which the carrier wave may be any one of eight preselected relative phases, a transmitter comprising a source of serial binary data intelligence signals, means for translating said serial data signals into different ones of four possible dibit pair combinations at a synchronous rate, a stable frequency source having a frequency eight times that of said carrier wave and emitting output pulses for each half cycle of said stable frequency, phase logic means for choosing proper ones of the output pulses to provide keying signals for a carrier wave at said preselected relative phases uniquely corresponding to the four dibit pairs, means for connecting said translating means and said stable frequency source to said logic means to establish joint control thereof, a pair of ringing circuits resonant at the frequency of said carrier wave, means for coupling the keying signals from said logic means alternately to said ringing circuits to control the phase of the oscillations therein whereby one such circuit is caused to oscillate in one of said preselected phases while the other such circuit returns to a non-oscillating condition, means for suppressing transients produced in said ringing circuits as the phase of the oscillation is shifted for each dibit by amplitude modulation of the oscillations of said ringing circuits, and means for combining the successive oscillations of said ringing circuits into a continuous line signal.

2. The transmitter set forth in claim 1 in which said logic means comprises first, second and third frequency-dividing circuits driven by said stable-frequency source for producing square waves at four, two and one times that of said carrier wave, means for reversing the phase of the square-wave signal from said first frequency-dividing means regularly at said synchronous rate, said phase reversal being equivalent to a 45 degree phase shift of said carrier wave, means for advancing the phase of the square wave signal from said second frequency-dividing means by 180 degrees whenever the dibit pair is composed of like elements, said 180 degree phase advance being equivalent to a 90 degree phase shift of said carrier wave, means for advancing the phase of the square-wave signal from said third frequency-dividing means by 180 degrees whenever the second element in a dibit pair is a marking element, said 180 degree phase advance being equivalent to a reversal of phase of said carrier wave, a pair of transmission gates providing a coupling between said frequency-dividing means and said ringing circuits, and means for alternately enabling said transmission gates by the square wave from said third frequency-dividing means and thereby passing a pulse from said frequency-source as keying signals whenever said first and second frequency-dividing means have identical concurrent phases, successive keying signals thereby occurring at twice the frequency of said carrier wave and at zero axis crossing points in said wave.

3. The transmitter set forth in claim 1 in which each of said ringing circuits comprises a pair of inductance coils, a capacitor, said coils and capacitor being connected in series and of such parameters as to be resonant at the frequency of said carrier wave, a first gate circuit for directing one of said keying signals to charge one of said coils in one direction, a second gate circuit for directing the other of said keying signals to charge the other of said coils in the opposite direction, and a third gate circuit responsive to both of said keying signals for grounding the terminals of said capacitor during the presence of each of said keying signals, said capacitor being charged in the intervals between keying signals from the currents in said coils and the consequent oscillations in voltage across said capacitor constituting the properly phased carrier wave for said transmitter.

4. A data transmitter comprising a source of binary "1" and "0" signals in a sequence of dibit pairs chosen from the combinations 10, 00, 01 and 11; a timing circuit producing a dibit synchronizing signal; digital logic means controlled by said timing circuit for synchronously generating a few cycles of a carrier wave every dibit period, each successive few cycles being shifted in relative phase at least 45 degrees even in the absence of an input signal; means for applying said dibit signals to said logic means as an input signal to cause said latter means to impart additional relative phase shifts to said successive few cycles of carrier wave of 0, 90, 180 or 270 degrees according to a fixed relationship between said dibit combinations and said additional phase shifts; and means for amplitude modulating the output of said logic means by a cosine wave occurring at half said dibit rate.

5. In a transmitter for a communication system in which serial binary data signals are paired and carried on a single tone and in which the phase of said tone may be any one of eight relative phases, a phase-modulated tone generator comprising a source of digital binary data in serial form, means for converting serial data bits into pairs in parallel form having outputs indicative of the sense of the data bits in each pair, frequency-source means for providing a stable frequency eight times the frequency of said tone, a pair of ringing circuits tuned to the frequency of said tone and normally at rest, phase-shift logic means controlled in accordance with the outputs of said converting means for gating appropriately phased signals from said frequency-source means to said ringing circuits, auxiliary steering means operative between said ringing circuits and said logic means for directing the output of said logic means alternately to one and the other of said ringing circuits whereby only one ringing circuit at a time is excited, means for modulating in amplitude the tones produced by said ringing circuits at a rate equal to that of said steering means whereby the transitions in phase of ringing circuit tones occur at minimum amplitude, and means for combining the modulated outputs of said ringing circuits to form a line transmission wave.

6. In a phase-modulated data transmission system in which the phase of a carrier wave may be any one of eight relative phases a data source furnishing binary signals as anyone of four possible dibit pairs; a stable frequency source operating at eight times the frequency of said carrier wave and emitting a pulse every half cycle; a pair of ringing circuits tuned to the frequency of said carrier wave; digital logic means for selecting from the output of said frequency source appropriate pulses in accordance with the dibit pair present in the output of said data source, each of the four possible dibit pairs being assigned a unique relative phase, thereby to excite said oscillatory ringing circuits into oscillation in the unique relative phase; means for alternately directing the pulses selected by said logic means to one and the other of said ringing circuits to produce sinusoidal output signals at the frequency of said carrier wave; means for modulating the carrier-wave outputs of ringing circuits in amplitude at half said transmission rate; and means for combining the two amplitude-modulated carrier-wave outputs into a continuous line signal.

7. In a phase-modulated carrier transmission system in which said carrier may assume any one of eight preselected relative phases and in which the relative phase shift between successive carrier phases represents a paired digital signal combination, a receiver comprising a delay line having a delay time equal to one signal interval and including two output points one of which emits a signal shifted 90 electrical degrees at the frequency of said carrier wave with respect to that emitted from the other output point, first means for intermodulating the direct received signal with the signal emitted from the 90 degree output point of said delay line, second means for intermodulating the direct received signal with that from the other output point of said delay line, first and second integrating means for summing the outputs of said first and second intermodulating means respectively over each signal interval and producing sawtooth signal output waves of positive or negative polarity depending on the difference in phase between the direct received signal and the signal emitted by said delay line, means for sampling the polarity of the outputs of said integrating means to determine the nature of the paired received digital signal combination, and means for recovering a synchronizing signal from the phase transitions in each signal interval, and means under the control of said synchronizing signal for quenching the output of said integrating means at the end of each signal interval.

8. A data transmission system comprising means for translating serial data signals to parallel form in pairs at a given transmission rate equal to one-half that of the serial data rate, means for computing a predetermined phase shift of an odd multiple of 45 degrees for successive pairs of data signals, a pair of ringing circuits each tuned to a single carrier frequency, means for applying successive signals representative of computed phases from said computing means to each of said ringing circuits alternately whereby the respective ringing circuits generate said carrier frequency in two quadrature phase angle sets displaced 45 degrees from one another, means for amplitude modulating the carrier waves from said ringing circuits by a cosine wave recurring at half the transmission rate, the respective cosine waves applied to the respective ringing circuits being displaced in opposite phases, a transmission line, means for applying the output of said modulating means to one end of said transmission line, means for delaying the wave received from the other end of said transmission line by the transmission time between successive pairs of data signals to form a first demodulating signal, means for shifting the phase of said first demodulated signal by 90 electrical degrees to form a second demodulating signal, means for intermodulating each of said first and second demodulating signals with the direct output of said transmission line, means for integrating the outputs of said intermodulating means over the transmission time between successive pairs of data signals, means for deriving synchronizing signals from said received signal, means for sampling the outputs of said integrating means at intervals determined by said synchronizing signals, and means for translating the respective outputs of said sampling means to serial form.

9. A communication system in which two channels of mark and space digital elements are paired and modulated on a single carrier wave in the form of eight relative phase changes comprising means for translating each of the paired mark and space signals into one of four quaternary phase-shift signals according to a predetermined plan during each signal interval, means for imparting to the phase-shift signals from said translating means an invariant 45 degree phase shift whereby the ultimate amount of phase shift produced is an odd multiple of 45 degrees for each paired signal, a pair of resonating circuits tuned to the frequency of said carrier wave, means for alternately exciting said resonating circuits by the output of said superimposing means whereby a succession of carrier wave bursts of constantly changing phase is produced, means for suppressing the production of transients in said carrier wave at the points of changing phase, means for combining the outputs of the two resonating circuits to form a line signal, a transmission line, means for applying said line signal at one end of said transmission line, means at the other end of said transmission line for delaying the line signal by one signal interval, means for comparing the phase of the immediately received signal with the delayed signal in order to recover the relative phase between successive signals, and means for converting the recovered phases into mark and space pulse signals.

10. A phase-modulation transmitter in which relative phase shifts of a carrier wave are made for each successive signal combination according to a predetermined code comprising a binary pulse message source from which signals are emitted in paired combinations at a synchronous rate; a phase-determining logic circuit driven by said message source comprising a timing source generating a first square wave at eight times the frequency of said carrier wave, a first scale-of-two count-down means driven by said first square wave to produce a second square wave at four times the frequency of said carrier wave, means for interrupting the count-down of said first count-down means for one-half cycle at the synchronous rate, a second scale-of-two count-down means driven by said second square wave to produce a third square wave at twice the frequency of said carrier wave, a third scale-of-two count-down means driven by the third square wave to produce a fourth square wave at the frequency of said carrier wave, first and second synchronously enabled gates interconnecting said message source and said second and third count-down means, respectively, means for activating said first gates responsive to paired combinations from said message source having like message elements whereby said third square wave experiences an additional phase reversal equivalent to a 90° phase change in said fourth square wave, means for activating said second gate responsive to a marking second element in a paired combination from said message source whereby said fourth square wave experiences an additional 180° phase change, simultaneous activation of said first and second gates by said activating means producing an equivalent 270° phase change in said fourth square wave, and means for sampling the third and fourth square waves at a rate equal to twice the frequency of said carrier wave to produce two trains of keying pulses at 180° phase positions of said carrier wave; a pair of ringing circuits tuned to the frequency of said carrier wave and normally at rest, each comprising at least a coil and a capacitor in series; means for directing said trains of keying pulses to said coil, one train causing current flow in one direction in said coil and the other train causing current flow in the opposite direction in said coil, and means for quenching said capacitor during the presence of said keying pulses whereby said coil current charges said capacitor between keying pulses and an accurately phased carrier wave oscillation occurs across said capacitor; a square-wave source operating at half the synchronous rate; means controlled by said last-mentioned square-wave source for alternately directing said keying pulses to said two ringing circuits; means for superimposing on the carrier wave oscillation appearing across the capacitors in said ringing circuits a cosine wave envelope derived from said last-mentioned square wave source; and means for combining the separate envelopes into a single transmitted carrier-wave signal.

References Cited in the file of this patent

UNITED STATES PATENTS

| | | |
|---|---|---|
| 2,852,607 | Treadwell | Sept. 16, 1958 |
| 2,870,431 | Babcock | Jan. 20, 1959 |
| 2,905,812 | Doelz et al. | Sept. 22, 1959 |
| 2,950,348 | Mayer et al. | Aug. 23, 1960 |